(12) United States Patent
Wong et al.

(10) Patent No.: US 6,247,142 B1
(45) Date of Patent: Jun. 12, 2001

(54) APPARATUS AND METHOD FOR PROVIDING REDUNDANCY IN A TRANSACTION PROCESSING SYSTEM

(75) Inventors: Dominic W. Wong, San Jose; Kevin T. Collins, Roseville; Brian A. Donnelly, San Jose, all of CA (US)

(73) Assignee: Aspect Communications, San Jose, CA (US)

( * ) Notice: Subject to any disclaimer, the term of this patent is extended or adjusted under 35 U.S.C. 154(b) by 0 days.

(21) Appl. No.: 09/137,978

(22) Filed: Aug. 21, 1998

(51) Int. Cl.$^7$ ..................................................... G06F 15/40
(52) U.S. Cl. ........................................ 714/5; 714/11; 714/9
(58) Field of Search .................................... 714/5, 6, 7, 8, 714/9, 11

(56) References Cited

U.S. PATENT DOCUMENTS 5,126,889 * 6/1992 Walden .................................. 360/53
5,848,230 * 12/1998 Walker ...................................... 714/7

* cited by examiner

Primary Examiner—Ly V. Hua
(74) Attorney, Agent, or Firm—Blakely, Sokoloff, Taylor & Zafman

(57) ABSTRACT

According to one embodiment a transaction processing system includes a first system controller and a second system controller coupled to the first system controller. The transaction processing system further includes a second multi-media system coupled to the second system controller. While the transaction processing system is operating in a normal mode, transactions are transmitted by the first multi-media system. Furthermore, transactions are received by both the first and second multi-media system. According to a further embodiment, transactions are transmitted and received by the second multi-media system upon the failure of the first multi-media system

22 Claims, 4 Drawing Sheets

APPARATUS AND METHOD FOR PROVIDING REDUNDANCY IN A TRANSACTION PROCESSING SYSTEM

FIELD OF THE INVENTION

The present invention relates to the field of transaction processing systems. More particularly, the present invention relates to an apparatus and method for providing multi-media system redundancy in a transaction processing system.

BACKGROUND OF THE INVENTION

Various types of systems are available for processing transactions (such as telephone calls). Call processing systems, such as automatic call distributors (ACDs), are available for processing incoming and outgoing telephone calls. For example, a customer may initiate a telephone call to a company's call processing system. The call processing system receives the incoming call and processes the call in various manners. The call may be routed to a telephone agent (e.g., a customer service agent) to answer the call and assist the customer. If all agents are busy, the call processing system may provide a recorded message to the customer explaining that all agents are busy, and place the call in a queue. Other call processing systems may provide an option to leave a message or listen to prerecorded answers to frequently asked questions.

Transaction processing systems include a system controller and a media processing system. The system controller typically processes the transactions received at the transaction processing system, while the media processing system is used to store recorded media transactions such as agent greetings, announcements and messages. Existing transaction processing systems employ a single media processing system. In these systems, a failure in the media processing system precludes the use of any type of voice access functions. Consequently, if the media processing system fails, a caller or agent may not record or listen to messages. Additionally, with existing transaction processing systems, all stored transaction data may be lost if the media processing system disk crashes. Transaction data is necessary, for example, to generate reports and monitor the performance of the transaction processing system and the associated agents.

Therefore, it is desirable to provide a transaction processing system that utilizes redundant media processing systems and other redundant systems or subsystems to prevent the loss of transaction data and other information.

SUMMARY OF THE INVENTION

According to one embodiment of the invention, a transaction processing system includes a first system controller. A first multi-media system is coupled to the first system controller. The transaction processing system further includes a second multi-media system coupled to the first system controller. The transaction processing system is configured such that the first multi-media system transmits transactions to the first system controller. Furthermore, transactions are received by both the first multi-media system and the second multi-media system.

In an embodiment of the invention, transactions are transmitted and received by the second multi-media system upon a failure of the first multi-media system.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

The following detailed description sets forth numerous specific details to provide a thorough understanding of the invention. However, those of ordinary skill in the art will appreciate that the invention may be practiced without these specific details. In other instances, well-known methods, procedures, protocols, components, algorithms, and circuits have not been described in detail so as not to obscure the invention.

The present invention is related to a transaction processing system capable of receiving transactions, such as real-time transactions, at redundant multi-media systems. Exemplary transactions include telephone calls, video calls, voice mail messages, electronic mail messages, facsimiles, and network sessions (such as Internet sessions). Transactions are received at a system controller and transmitted and recorded to a primary multi-media system and a secondary multi-media system. In order to play or retrieve a transaction, the system controller designates one of the multi-media systems to transmit the transaction to the system controller. If a failure occurs at either the primary or secondary multi-media system, the system controller selects the non-failed system as a stand-alone unit. By providing redundant multi-media systems, the transaction processing system significantly reduces the possibility of lost transaction data and other information stored in the multi-media systems.

Figure 1:
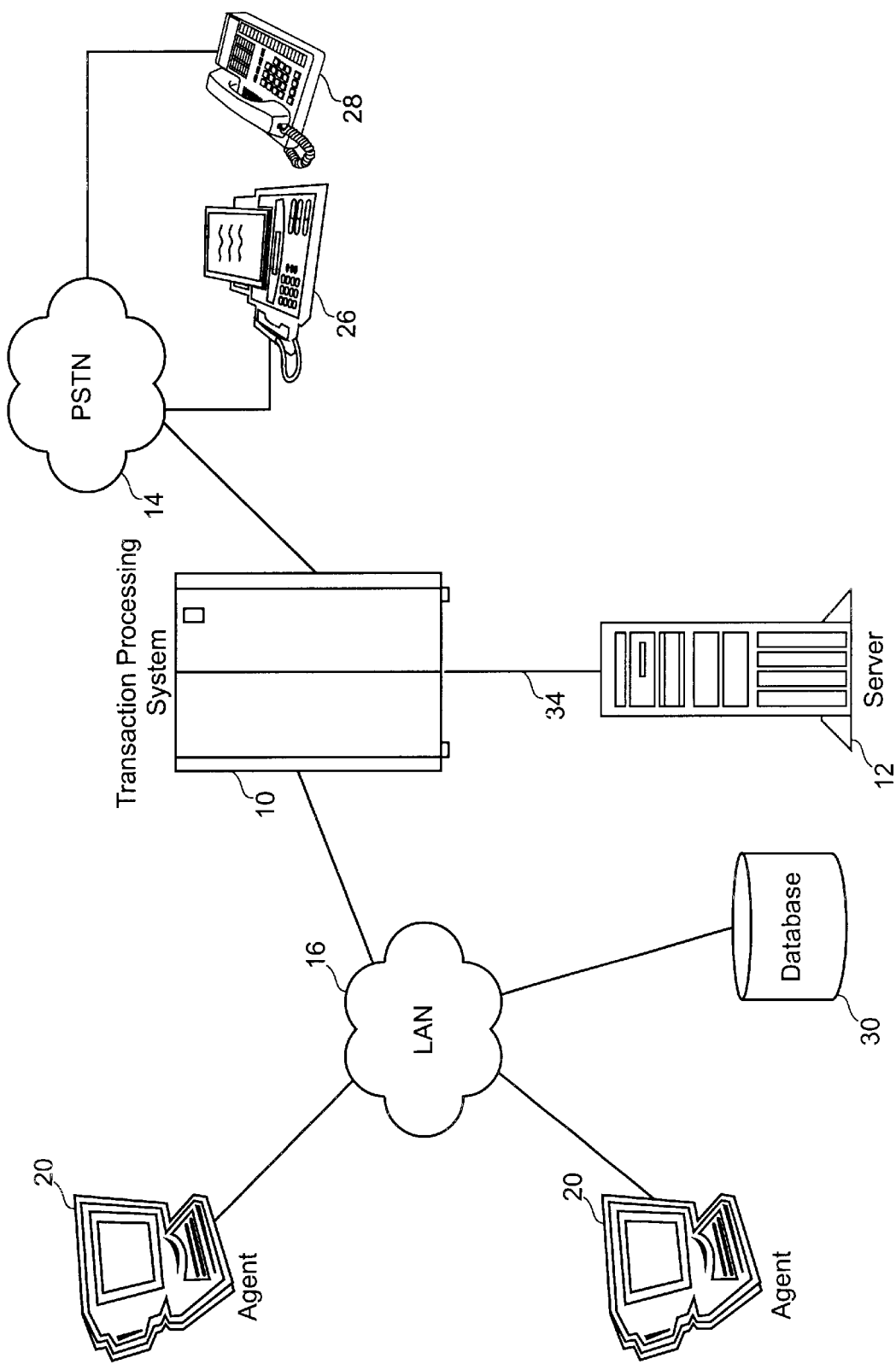
FIG. 1 illustrates an embodiment of a transaction processing environment according to the present invention.

FIG. 1 illustrates an embodiment of a transaction processing environment in which the present invention may be used. The transaction processing environment of FIG. 1 allows transaction initiators (e.g., customers) to contact an agent (e.g., a customer service agent) using various types of transactions. Similarly, the transaction processing environment allows an agent to respond to a received transaction (e.g., received from a customer) or initiate a new transaction.

A transaction processing system 10 is coupled to a server 12, a public switched telephone network (PSTN) 14 and a local area network (LAN) 16. Although not shown in FIG. 1, LAN 16 may be coupled to other networks (e.g., the Internet) through one or more network devices. Transaction processing system 10 is capable of processing various types of transactions, such as telephone calls, electronic mail (e-mail), voice mail, and facsimiles. Transaction processing system 10 is capable of receiving transactions from PSTN 14, LAN 16, and server 12. Similarly, transaction processing system 10 is capable of transmitting transactions to PSTN 14, LAN 16, and server 12. For example, transaction processing system 10 can receive an incoming telephone call directly via PSTN 14. Another incoming telephone call may be received by server 12 (e.g., an Internet telephone call received across the Internet) and provided to transaction processing system 10 across a communication link 34 or across LAN 16. In other situations, transaction processing system 10 may receive an incoming e-mail message from server 12 or LAN 16. According to one embodiment, transaction processing system 10 is an automatic call distributor (ACD). However, those of ordinary skill in the art will appreciate that transaction processing system 10 can be any system or device capable of receiving, processing, routing, transmitting, or otherwise handling telephone calls, video calls, electronic mail, facsimiles, network sessions (e.g., sessions across the Internet), or other information. The teachings of the present invention may be used with any type of transaction processing system and any type of transaction.

FIG. 1 further illustrates a server 12 capable of interacting with various components in the transaction processing environment. For example, server 12 may operate as a web server, an e-mail server, a fax server, or a video server. LAN 16 can be any type of network, including an intranet network, capable of communicating information between various nodes in the network. Further, LAN 16 may use any network topology and communicate data using any communication protocol. As shown in FIG. 1, multiple agents 20 are coupled to LAN 16. In a typical transaction processing environment, hundreds or thousands of agents may be coupled to one or more LANs 16, which are coupled to transaction processing system 10.

A database 30 is coupled to LAN 16 and is used by transaction processing system 10, agents 20, and server 12 to store and retrieve various types of information. For example, database 30 may contain information about the transaction processing system, the performance of the system, and the agents and customers that use transaction processing system 10. Since database 30 is coupled to LAN 16, all agent computers, servers, and other devices coupled to LAN 16 are capable of storing and retrieving information from the database. FIG. 1 also illustrates a caller's telephone 28 and fax machine 26, which are coupled to PSTI 14 and capable of initiating or receiving transactions via PSTN 14. Although not shown in FIG. 1, a particular user may have a personal computer or other computing device capable of communicating with transaction processing system 10 (e.g., via PSTN 14 or a network such as the Internet). The personal computer or other computing device may be used to exchange transaction information between a user and a transaction processing system (e.g., an agent coupled to a transaction processing system).

Figure 2:
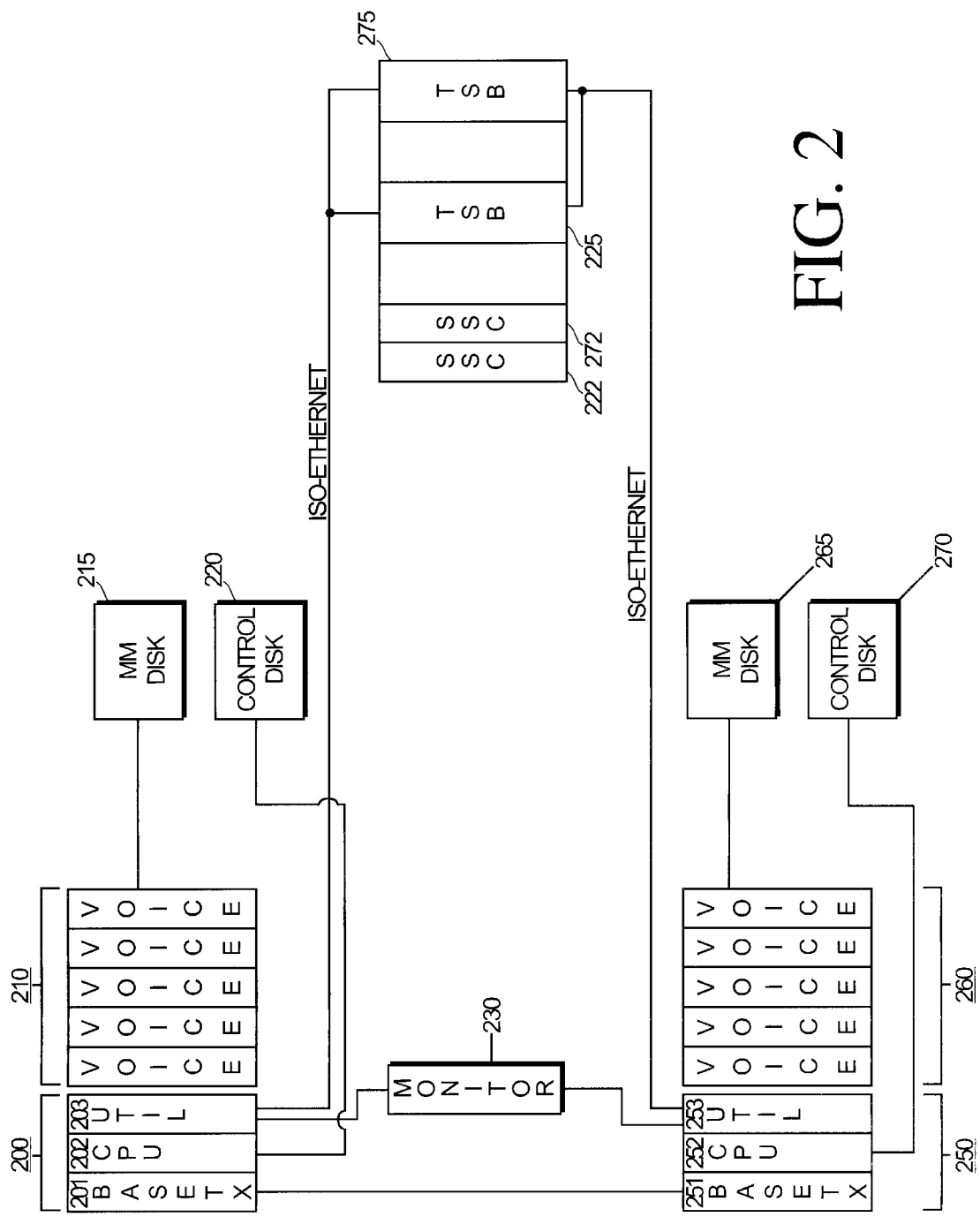
FIG. 2 illustrates an embodiment of transaction processing system according to the present invention.

FIG. 2 illustrates an embodiment of transaction processing system 10 according to the present invention. Transaction processing system 10 includes system controllers 200 and 250, voice cards 210 and 260, multi-media disks (MM disks) 215 and 265, control disks 220 and 270, switching sub-system controllers (SSC) 222 and 272, time slot bridges (TSB) 225 and 275, and hardware monitor 230. In a particular embodiment of the invention, MM disks 215 and/or 265 may include one or more physical hard disk drives or other storage mechanism. Voice cards 210 and MM disk 215 may be jointly described as a multi-media system. Similarly, voice cards 260 and MM disk 265 can be jointly described as a multi-media system.

System controllers 200 and 250 are configured to control the flow of transactions into and out of transaction processing system 10. According to one embodiment, system controllers 200 and 250 are capable of receiving, transmitting, queuing, routing, or otherwise processing a transaction. System controller 200 includes a base transmitter 201, a central processing unit (CPU) 202 and a utility module 203. System controller 250 includes a base transmitter 251, a CPU 252 and a utility module 253. Base transmitters 201 and 251 are, for example, Local Area Network (LAN) based communications systems that provide communication between system controllers 200 and 250.

CPUs 202 and 252 process and route transactions received at transaction processing system 10. Utility modules 203 and 253 are configured to communicate with TSB 225 and 275, respectively. Further, utility modules 203 and 253 are monitors that are configured to detect failures on various components such as CPU 202 and 252, voice cards 210 and 260, and TSB 225 and 275. Hardware monitor 230 is configured to monitor and detect a failure on system controller 200 and switch over to system controller 250, or vice versa.

According to one embodiment of the invention, transaction processing system 10 is configured such that only one system controller is active at any particular time. The second system controller serves as a backup. In such an embodiment, system controller 200 is the primary controller and system controller 250 is the secondary (or backup) controller. For example, if utility module 203 detects a failure in system controller 200, a switch-over is made such that system controller 250 is activated and system controller 200 is deactivated. If utility module 203 fails, the failure is detected by hardware monitor 230, which then activates system controller 250 as the primary controller. Those of ordinary skill in the art will appreciate that transaction processing system 10 may also be configured such that system controller 250 is the primary controller and system controller 200 is the backup controller.

Voice cards 210 and 260 are configured to record transactions received from PSTN 14, and to play transactions that are to be transmitted to PSTN 14. Although the embodiment of FIG. 2 illustrates multiple voice cards 210 and 260, those of ordinary skill in the art will appreciate that various other types of cards or modules can be used to handle multiple types of transactions. Voice cards 210 and 260 may also record and play internal transactions such as prerecorded greetings from agent 20. Voice cards 210 and 260 include voice modules that are event handlers for all multi-media transactions. According to one embodiment of the invention, voice cards 210 and 260 are coupled to system controllers 200 and 250, respectively, via a local transport mechanism such as an bus connection between the utility modules and the voice cards. However, in an alternative embodiment, voice cards 210 and 260 may be coupled to system controllers 200 and 250 by an Ethernet connection. In a further embodiment, voice cards 210 are coupled to system controller 250, and voice cards 260 to system controller 200, via the same local transport mechanism.

SSCs 222 and 272 transfer events between TSBs 225 and 275, and system controllers 200 and 250. TBs 225 and 275 gate time slot information (e.g., pulse code modulation (PCM)-encoded voice information) between switching modules and ISO-Ethernet connections through utility modules 203 and 253. This enables audio signals produced by voice cards 210 and 260 to be heard by line cards (e.g., trunks) in the switching modules. The TSBs provide voice connectivity to the voice cards via, for example, an ISO-Ethernet connection. According to one embodiment, TSB 225 and 275 are coupled to utility modules 203 and 253, respectively, via an ISO-Ethernet connection. One of ordinary skill in the art, however, will appreciate that TSB 225 and 275 may be coupled to the utility modules using other methods of communication. In alternate embodiments of the invention, time slot information may include any type of information or data (such as fax information, video information, electronic mail information, or network information).

Control disks 220 and 270 are coupled to CPUs 202 and 252, respectively. Control disks 220 and 270 are configured to store software and other information used by transaction processing system 10. According to one embodiment, control disks 220 and 270 are located within the system controllers 200 and 250, respectively. However, in an alternate embodiment of the invention the control disks are located remotely from the system controllers. MM disks 215 and 265 are also coupled to CPUs 202 and 252, respectively, and are configured to store prerecorded greeting messages, messages recorded by agents and customers, and other types of transactions or information. MM disks 215 and 265 are typically located within system controllers 200 and 250, but may alternatively be located remotely from the system controllers.

According to one embodiment, transaction processing system 10 is configured such that voice cards 210 and TSB 225 are primary and voice cards 260 and TSB 275 are backups. In such an embodiment, transactions received from PSTN 14 (or internal transactions) are recorded at both voice cards 210 and 260. Transactions to be transmitted (e.g., across PSTN 14) are transmitted from voice cards 210 and voice cards 260. However, only the active (e.g., primary) TSB actually provides data from the ISO-Ethernet link to the PSTN or other destination. If a failure is detected in voice cards 210 or TSB 225, utility module 203 instructs CPU 202 of the failure and CPU 202 deactivates voice cards 210. Voice cards 260 will then operate as a stand-alone unit. Consequently, voice cards 260 will transmit transactions to be received by PSTN 14 (or internal transactions), in addition to recording transactions received from PSTN 14 (or internal transactions) to MM disk 265. If a failure is detected in voice cards 260 or ISB 275, voice cards 210 will then operate in a stand-alone mode. Voice cards 210 will therefore continue to transmit transactions to be received by PSTN 14, as well as record transactions received from PSTN 14.

After a failure in voice cards 210 or 260 is diagnosed and repaired, the voice cards can be placed back on-line. However, once the failed voice cards are ready to be placed back on-line, the stored data in the related MM disk is likely to be different than the data stored in the currently active MM disk because transaction data was likely stored by the active voice cards while the failed voice cards were inactive. Therefore, the data in the failed MM disk must be synchronized with the data in the active MM disk. According to one embodiment, the failed MM disk can be synchronized with the active MM disk while transaction processing system 10 remains active (or on-line). The synchronization process is carried out by transmitting an image copy of the data stored on the active MM disk to the failed MM disk. In an alternate embodiment, the failed MM disk can be synchronized with the active MM disk using an offline synchronization procedure when the entire system is down (inactive). Additional details regarding synchronization procedures can be found in U.S. Pat. No. 5,469,503, entitled Method for Resynchronizing Secondary Database and Primary Database with Preservation of Functionality of an Automatic Call Distribution System.

To implement the on-line synchronization, the operation of transaction processing system 10 is frozen for the required time interval while the data is copied. According to one embodiment, transaction processing system 10 is frozen for five seconds while the data is synchronized between the MM disks. According to a further embodiment, transactions may be received and transmitted from transaction processing system 10 during the frozen time interval because data is not being saved or updated. After the synchronization process is completed, both sets of voice cards are placed on-line, and the primary-backup relationship described above is resumed.

According to another embodiment, transaction processing system 10 may be completely taken off-line before the synchronization process occurs. After synchronization, transaction processing system 10 is restarted, with the voice cards resuming the primary-backup relationship. According to one embodiment, a system user may choose either the on-line or off-line synchronization process.

Figure 3:
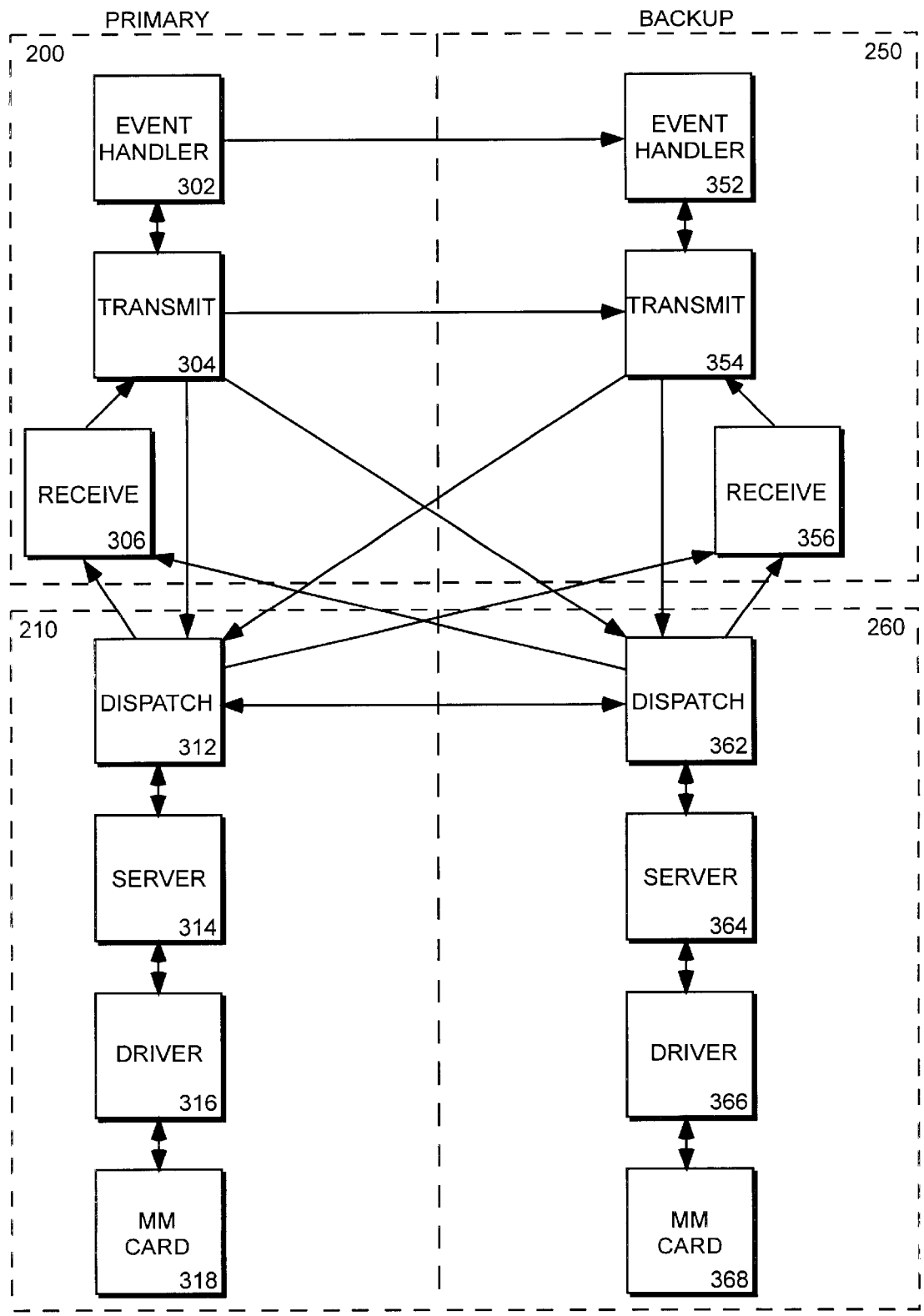
FIG. 3 illustrates an embodiment of a control system for a transaction processing system.

FIG. 3 illustrates an embodiment of a control system for transaction processing system 10 according to the present invention. Referring to FIG. 3, the control system of system controllers 200 and 250, and voice cards 210 and 260 are shown. The system controllers include event handlers 302 and 352, transmit modules 304 and 354, and receive modules 306 and 356. Event handlers 302 and 352 receive and repeat transaction events and messages throughout transaction processing system 10 and to PSTN 14. Transmit modules 304 and 354 receive transaction messages and events from event handlers 302 and 352, respectively, and transmit the events and messages to voice cards 210 and 260, respectively. In addition, transmit modules 304 and 354 transmit transaction events and messages to the event handlers. Receive modules 306 and 356 receive transaction events and messages from voice cards 210 and 260, respectively, and transmit the events to the transmit modules.

As described above, only one system controller is active (e.g., system controller 200), while the other serves as a backup (e.g., system controller 250). Accordingly, event handler 302, transmit module 304 and receive module 306 are used for primary operation, while event handler 352, transmit module 354 and receive module 356 are used as backups.

Voice cards 210 and 260 include dispatch modules 312 and 362, servers 314 and 364, drivers 316 and 366, and multi-media (MM) modules 318 and 368. Dispatch modules 312 and 362 receive transaction events and messages from the transmit modules of the voice cards. Further, dispatch modules 312 and 362 transmit transaction events and messages to the receive modules of the voice cards. Servers 314 and 364 handle event logic processing as well as the transmission of transaction events and messages to the dispatch modules. Servers 314 and 364 also send/receive messages to the drivers. Drivers 316 and 366 communicate with MM modules 318 and 368. In addition, drivers 316 and 366 transmit transaction events and messages to the servers. MM modules 318 and 368 provide multi-media encoding/decoding and compression/decompression of multi-media data.

As described above, voice cards 210 are the primary system and voice cards 260 are the backup. Since both systems are capable of receiving real-time transactions, the dispatch modules receive transactions from the transmit module of the active system controller. For example, dispatch module 312 and 362 receive transactions from transmit module 304 during normal operation, and from transmit module 354 upon the failure of system controller 200. However, only the dispatch module of the primary voice cards transmits transactions to the receive module of the active system controller (e.g., receive module 306) under normal operating conditions.

When both multi-media systems 210 and 260 are active, the receive module (306 or 356) on the active system controller does not generate a "transaction complete" message until both dispatch modules 312 and 362 have indicated that the transaction is complete. When both dispatch modules 312 and 362 indicate that their transaction is complete, the receive module on the active system controller generates a "transaction complete" message and transmits the message to the transmit module (304 or 354) on the active system controller. By waiting until both dispatch modules indicate a completed transaction, the system avoids starting a new transaction before both the primary system and the backup system have completed the previous transaction. A particular transaction may be processed faster on the primary system than the backup system (or vice versa) due to different processing resources and other factors. Thus, if the primary system completes the transaction prior to the backup system, a new transaction will not be initiated until the backup system completes the previous transaction. The situation in which the backup system completes the transaction prior to the primary system is handled in the same manner.

Figure 4:
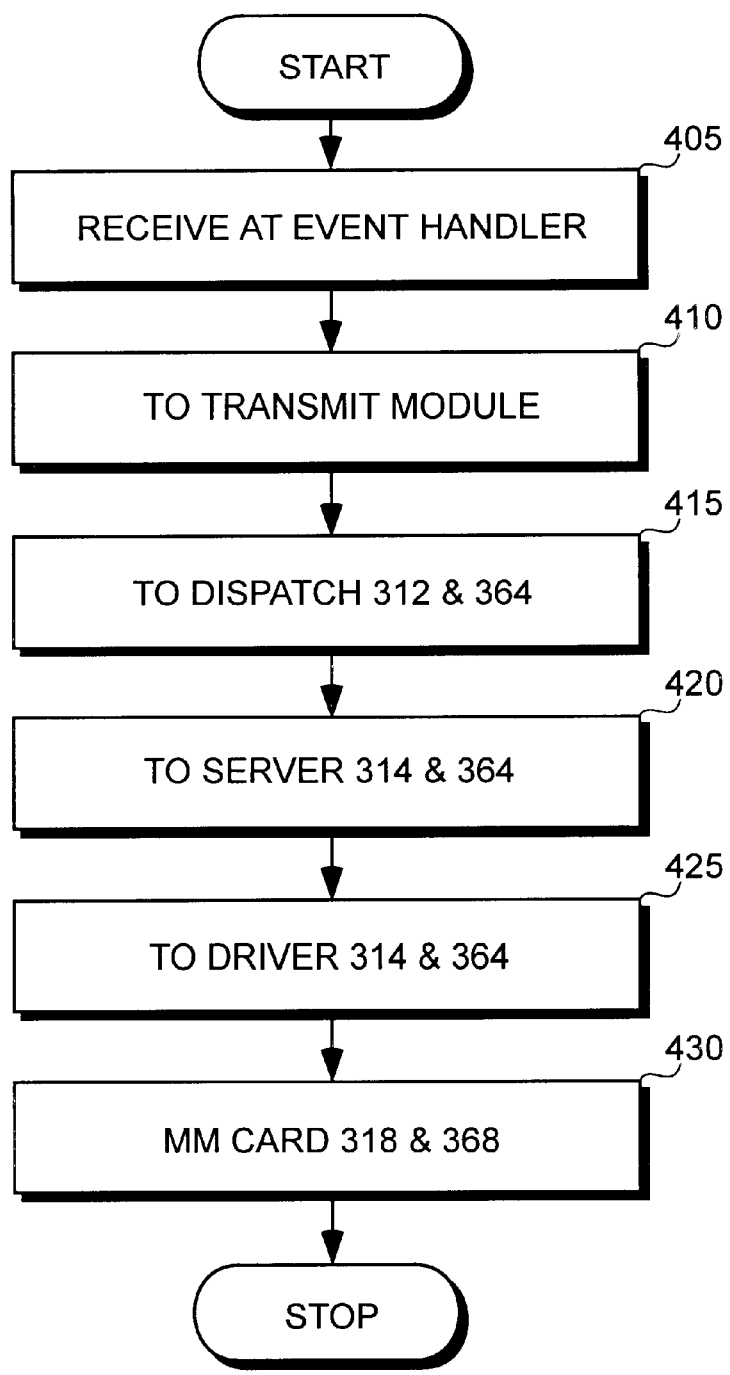
FIG. 4 is a flow diagram of a multi-media record transaction according to one embodiment of the present invention.

FIG. 4 illustrates a flow diagram of a multi-media record transaction according to one embodiment of the present invention. At step 405, event handler 302 receives a transaction The transaction is then provided to transmit module 304 at step 410. Transmit module 304 transmits the transaction to both dispatch module 312 and 362 at step 415. Next, in step 420, the transaction is transmitted to servers 314 and 364 where it is translated to a multi-media operation. At step 425, the transaction is transmitted to drivers 316 and 366 to begin the operation. Finally, the transaction is recorded by MM modules 318 and 368 to the respective MM disks at step 430. If a failure occurs at the primary system controller, steps 405 and 410 are carried out by event handler 352 and transmit module 354 of the backup system controller 250.

As mentioned above, FIG. 4 illustrates a flow diagram of a multi-media record transaction according to one embodiment of the present invention. A similar procedure is followed for a multi-media play transaction. The difference between the multi-media record transaction and the multi-media play transaction is that data is written to the MM disk during the multi-media record transaction and read from the MM disk during the multi-media play transaction.

If a voice card fails during a multi-media play transaction or a multi-media record transaction, the same process as described in FIG. 3 occurs with respect to record transactions. For all transactions the process is the same, except that the transactions are received from the active transmit module at only one dispatch module. For example, if voice cards 210 fail and system controller 200 is active, the transaction is received from transmit module 304 at dispatch module 362 only. However, if voice cards 260 fail, only dispatch module 312 receives the transaction.

Thus, a transaction processing system having a redundant multi-media system has been described.

What is claimed is:

1. A voice transaction processing system comprising:
a first controller;
a first multi-media system including a first storage system and a first voice card coupled to the first system controller; and
a second multi-media system including a second storage system and a second voice card coupled to the first system controller, wherein the first multi-media system transmits voice transactions to the first system controller, and wherein the first multi-media system and second multi-media system receive voice transactions from the first system controller.

2. The system of claim 1 further comprising a second system controller coupled to the first system controller and the first and second multi-media systems, wherein the second system controller transmits and receives transactions from the first and second multi-media systems upon a failure of the first system controller.

3. The system of claim 2 wherein the second multi-media system transmits and receives transactions upon a failure of the first multi-media system.

4. The system of claim 3 wherein the first multi-media system is reset while the transaction processing system remains active.

5. The system of claim 3 wherein the first multi-media system is reset while the transaction processing system is inactive.

6. The system of claim 2 wherein the first system controller includes a first utility module and the second system controller includes a second utility, module.

7. The system of claim 6 further comprising a hardware monitor coupled to the first and second utility modules.

8. The system of claim 6 further comprising:
a first time slot bridge coupled to the first utility module; and
a second time slot bridge coupled to the second utility module.

9. The system of claim 2 further comprising
a first control disk coupled to the first system controller; and
a second control disk coupled to the second system controller.

10. The system of claim 2 wherein either the first or second system controller is configured to operate as a stand-alone unit.

11. The system of claim 2 wherein the first and second multi-media systems transmit and receive transactions using a public switched telephone network.

12. The system of claim 2 wherein the first and second multi-media systems transmit and receive transactions using a data netpork.

13. The system of claim 1 further comprising:
a first multi-media disk coupled to the first multi-media system; and
a second multi-media disk coupled to the second multi-media system.

14. A voice transaction processing system comprising:
primary multi-media components including a first storage system and a first voice card;
secondary multi-media components including a second storage system and a second voice card; and
primary control components coupled to the primary and secondary multi-media components, wherein the primary control components control both the primary multi-media components and the secondary multi-media components simultaneously.

15. The system of claim 14 further comprising secondary control components configured to control the primary and secondary multi-media components upon a failure of the primary control components.

16. The system of clam 15 wherein the primary and secondary control components further comprise:
an event handler;
a transmit component; and
a receive component.

17. The system of claim 15 wherein the primary and secondary multi-media components further comprise:

a dispatch component;

a server component; and a driver component.

18. A method of processing a voice transaction in a voice transaction processing system comprising a first system controller, a first multi-media system including a first storage system and a first voice card, and a second multi-media system including a second storage system and a second voice card, said method comprising the steps of:

receiving a voice transaction at said first system controller;

transmitting said voice transaction from said first system controller to said first multi-media system; and transmitting said voice transaction from said first system controller to said second multi-media system.

19. The method of claim 18 wherein the steps of transmitting said transaction from said first system controller to said first multi-media system and transmitting said transaction from said first system controller to said second multi-media system are performed simultaneously.

20. The method of claim 18 further comprising the step of generating a transaction complete message when the first multi-media system and the second multi-media system have both completed processing the transaction.

21. The method of claim 18 further comprising the steps of:

storing said transaction in said first multi-media system; and storing said transaction in said second multi-media system.

22. The method of claim 21 further comprising the steps of:

retrieving said transaction from said first multi-media system; and transmitting said transaction from said first multi-media system to said first system controller.

* * * * *